United States Patent Office 3,060,181
Patented Oct. 23, 1962

3,060,181
PREPARATION OF 2,4-DIAMINO-s-TRIAZINES
Lothar Strassberger and Gerhard Wendlberger, Trostberg, Germany, assignors to Suddeutsche Kalkstickstoff-Werke A.G., Trostberg, Germany
No Drawing. Filed Nov. 10, 1960, Ser. No. 68,360
Claims priority, application Germany Nov. 12, 1959
1 Claim. (Cl. 260—249.9)

The invention relates to the preparation of symmetrical triazines (guanamines) which are produced by reacting salts of aroyl cyanamides or acyl cyanamides with guanidine salts.

A great number of preparation methods are compiled in the book "s-Triazines and Derivatives," by E.M. Smolin and L. Rapoport, Interscience Publishers, New York 1959. All these known methods present drawbacks. Either the starting materials, like acyl and aroyl guanidines, biguanides, nitriles, are not readily available, or there are losses by side-reactions in the formation of the triazine ring.

We have found that salts of cyanamide derivatives of the general formula R.CO.NB.CN, which are readily obtained from calcium cyanamide, are easily converted in almost quantitative yields to the corresponding guanamines. Such cyanamide derivatives are prepared by means of acids and acid derivatives having a sufficiently high acid potential, such as the chlorides, anhydrides, and also esters of acids. Of particular advantage for such procedure is the ready aroylability and acylability of aqueous calcium cyanamide solutions with aromatic, hydroaromatic and also some aliphatic acid derivatives, whereby the desired cyanamide salts are mostly obtained in quantitative yields, particularly when acid chlorides are used. The preparation may proceed according to the following equations:

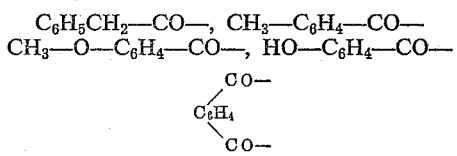

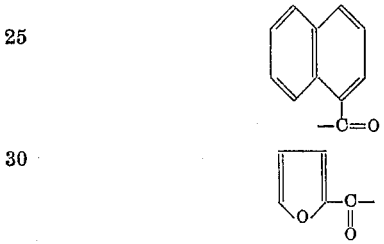

$$Ca(OH)_2 + 2HCl \rightarrow CaCl_2 + 2H_2O$$

R.CO=organic acid radical

As the salts obtained are usually difficultly soluble in water, they are easily separated from the $CaCl_2$ solution.

According to the properties of the reactants, the acylation may also be carried out in an organic medium or without addition of a solvent, for instance when water sensitive acylating agents are used.

The sequence of steps producing triazines from said cyanamide derivatives and guanidine salts by a ring closure reaction probably proceeds as follows:

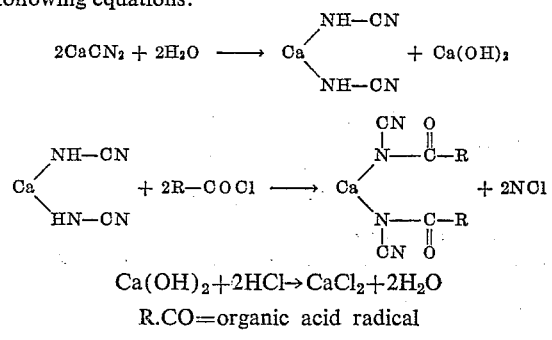

B=base, RCO=organic acid radical, X=acid radical

This result is surprising because the reactions responsible for the formation of the triazine ring, like the attachment of the guanidine salt to the nitrile group and the condensation of the carbonyl group, alone gave only low yields. Only the coupling of the two reaction steps produces a fast and smooth reaction without requiring catalysts or condensing agents.

Suitable bases B are particularly the alkali metals, such as Na, K, and $NH_4$, the alkaline earth metals Mg, Ca, Ba, and also Zn.

The organic acid radical may be an aliphatic saturated acid radical $C_nH_{(2n+1)}CO$—, wherein $n$ is an integer from 1 to 17. One or more of the H atoms may be substituted by halogen, oxy, carboxy, ether, and other functional groups. Also aliphatic dicarboxylic acid radicals with hydrocarbon chains of 2 to 7 $CH_2$ groups may be used. Also suitable are the radicals of aromatic or hydroaromatic polycarboxylic acids, such as $C_6H_{11}$—CO—, $C_6H_5CH_2$—CO—, $CH_3$—$C_6H_4$—CO—
$CH_3$—O—$C_6H_4$—CO—, HO—$C_6H_4$—CO—

$$C_6H_4\diagup^{CO-}_{\diagdown CO-}$$

and radicals of heterocyclic monocarboxylic and polycarboxylic acids, such as

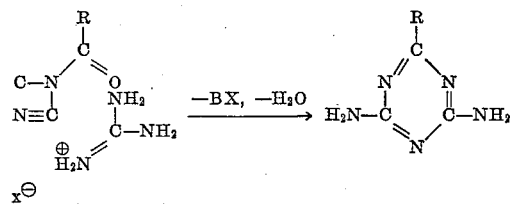

The reaction is very easily carried out. In a preferred embodiment of the invention, the reactants are molten together either in equivalent amounts or with an excess of the cheaper component in an open vessel at temperatures of about 140 to 240° C. which are below or not substantially above the melting point of the desired guanamine; said temperature is maintained until the melt starts to solidify. If the obtained guanamine is insoluble in water, the reaction product is leached out with water, whereby the guanamine remains in great purity. For the preparation of water soluble guanamines, the starting materials may be selected so as to produce water insoluble salts; in this case, they may readily be separated from the aqueous guanamine solutions.

In suitable cases, the guanamines may be purified by sublimation, also under reduced pressure.

As the reaction consists essentially in the formation of water, all conventional steps may be employed which assist such formation, such as operating under reduced pressure, addition of hygroscopic agents, passage of inert gases with or without pressure.

The reaction may also be carried out in an indifferent solvent or in suspension, whereby the high reaction temperature requires solvents of a correspondingly high boiling point.

The following examples illustrate the invention. All parts are given by weight unless indicated otherwise.

EXAMPLE 1

80 parts of calcium benzoylcyanamide .$2H_2O$ are molten with 65 parts of guanidine nitrate (mole ratio 1:2) in an open vessel with vigorous stirring at a temperature of 180 to 220° C. and agitated until the melt starts solidifying. Then the reaction mixture is allowed to cool down, and subsequently with hot water until the calcium nitrate formed in the reaction has been dissolved. The undissolved residue of benzoguanamine is filtered, thoroughly washed with water, and dried. It is of high purity and has a melting point of 223–225° C.

EXAMPLE 2

25 parts of calcium benzoylcyanamide (79%) are reacted with 17 parts of guanidine nitrate (mole ratio 1:2) under reduced pressure at a temperature of 180 to 200° C. There are obtained 20.6 parts of benzoguanamine (about 92% of theory).

EXAMPLE 3

95 parts of a 95% potassium benzoylcyanamide are reacted with 62 parts of guanidine sulfate (mole ratio 1:1) in the molten state in a crucible at a temperature of 200 to 230° C. within 45 minutes. The reaction product is processed as set forth in Example 1. Almost pure benzoguanamine (M.=222–225° C.) is obtained in a yield of 85 percent.

The reaction is represented by the equation

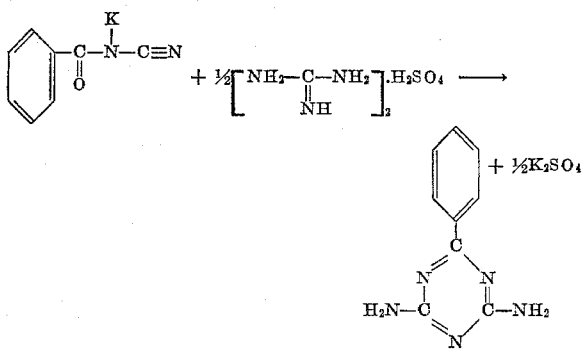

EXAMPLE 4

100 parts of calcium benzoylcyanamide (75%) and 55 parts of guanidine hydrochloride are suspended in 1000 parts of nitrobenzene and heated at a temperature of 210° C. in a 2 liter 3-neck flask equipped with stirrer and distillation bridge. The contents of the flask are maintained at said temperature for about 1 hour with vigorous stirring. The water formed during the reaction distills off continuously. Subsequently, the nitrobenzene is distilled off under reduced pressure, and the residue is processed as set forth in Example 1. Benzoguanamine of a melting point of 218 to 220° C. is obtained in about 70 percent of the theoretical amount.

EXAMPLE 5

Acetoguanamine

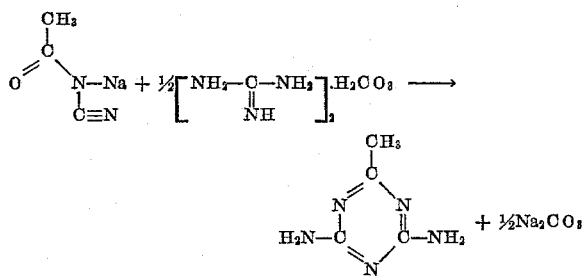

83 parts of sodium acetylcyanamide are molten with 76 parts of guanidine carbonate in a mole ratio of 1:0.5 in an open crucible with stirring at a temperature of 180 to 220° C.

After solidification of the melt, the cake is taken up in about 1000 parts of water and heated until the product has been completely dissolved. Subsequently, the solution is filtered and slowly cooled, whereby completely pure acetoguanamine (M.=271–272° C.) is precipitated in a yield of 75 to 80 percent.

EXAMPLE 6

83 parts of sodium acetylcyanamide are molten together with 152 parts of guanidine carbonate in a mole ratio of 1:1 in an open crucible with stirring at a temperature of 180 to 220° C. The melt is processed as set forth in Example 5.

The yield is almost quantitative, calculated on Na-acetylcyanamide.

EXAMPLE 7

Phthalobiguanamine

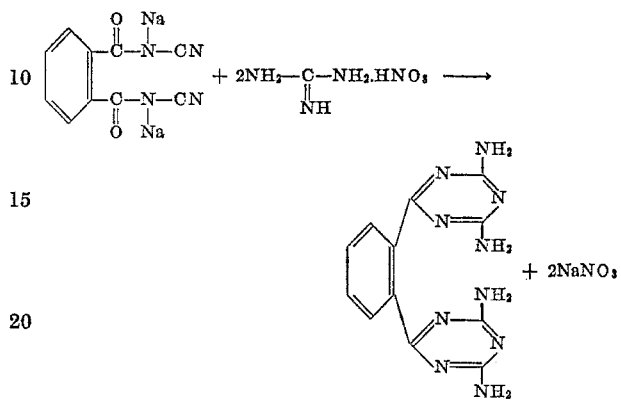

20 parts of di-(N-sodium-N-cyano)-phthalamide are molten together with 18 parts of guanidine nitrate (mole ratio 1:2) at a temperature of 150 to 180° C. under reduced pressure with continuous removal of the water formed during reaction. After termination of the reaction, the reaction mixture is leached out with hot water and then digested with dilute alkali in order to remove the impurities.

The obtained phthalo-bi-guanamine, which may also be designated ortho-bis-[2,4-diamino-1,3,5-triazin-6-yl]-benzene, has a melting point of 356–359° C.

EXAMPLE 8

20 parts of m-nitrobenzoyl-calcium cyanamide are reacted with 11.8 parts of guanidine nitrate (mole ratio 1:2) at a temperature of about 140 to 210° C., while the formed water is continuously drawn off. There are obtained 20 parts of m-nitrobenzoguanamine having a melting point of 241 to 244° C.

The reaction mixture is processed as described in Example 1.

EXAMPLE 9

Adipoguanamine

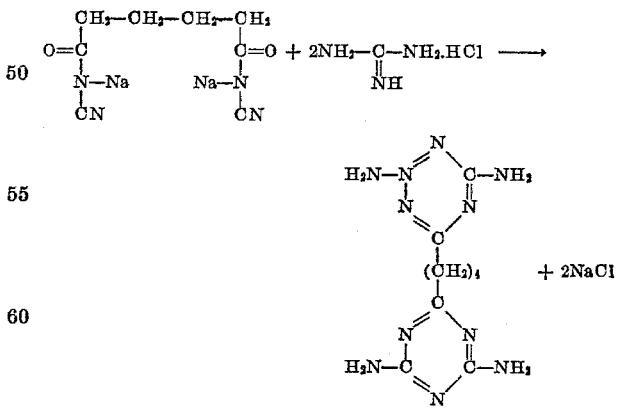

The reaction of 20 parts of adipic acid-bis-(sodium cyanamide) with 16 parts of guanidine hydrochloride under reduced pressure at a temperature of 150 to 190° C. produces about 14 parts of adipoguanamine (M.=297–300° C.); a more precise designation of the compound may be 1,4-bis-[2,4-diamino-1,3,5-triazin-6-yl]-butane.

EXAMPLE 10 p-Chlorobenzoguanamine 19 parts of p-chlorobenzoyl-calcium cyanamide are heated with 11.6 parts of guanidine nitrate in 100 parts of nitrobenzene with stirring at 210° C. for about 3 hours. Subsequently, the solvent is removed in vacuo, and the residue recrystallized from dilute hydrochloric acid. The free base is obtained by addition of the corresponding amount of alkali metal hydroxide. The yield of p-chlorobenzoguanamine is about 60 to 70 percent of theory. M.=248–249° C.

EXAMPLE 11

*Hexahydrobenzoguanamine*

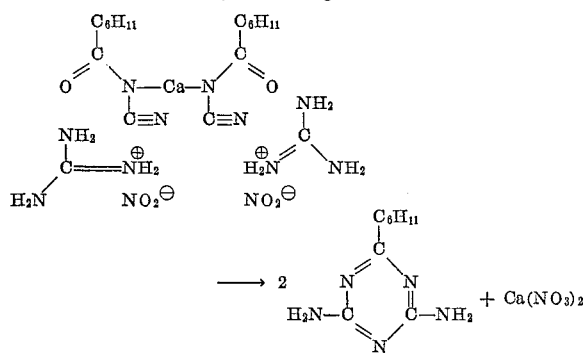

16.4 parts of calcium cyclohexoylcyanamide are molten together with 12 parts of guanidine nitrate at a temperature of 220–240° C. under reduced pressure (about 14 mm. Hg) and vigorous stirring within 15 minutes. The cooled melt is leached with hot water, and the insoluble hexahydrobenzoguanamine is filtered. It is obtained in a yield of 80 percent and has a melting point of 210° C.

It will be obvious to the skilled in the art that the preceding examples can be multiplied infinitely by varying the starting materials therein.

We claim:

A process for the preparation of 2,4 - diamino - 6-substituted-1,3,5-triazines comprising reacting at a temperature of about 140 to 240° C. an organic acid substituted cyanamide salt of a member of the group consisting of alkali metals, ammonium, alkaline earth metals, and zinc, wherein said organic acid is selected from the group consisting of lower alkanoic acids, lower alkanedioic acids, benzoic acid, chlorobenzoic acids, nitrobenzoic acids, phthalic acids, and cycloalkyl carboxylic acids, with a guanidine salt selected from the group consisting of guanidine carbonate, guanidine sulfate, guanidine nitrate, and guanidine chloride, and recovering the obtained s-triazine compound.

References Cited in the file of this patent

Smolin et al.: s-Triazines and Derivatives (New York, 1959), page 222.